(12) United States Patent
Prache

(10) Patent No.: US 6,760,034 B2
(45) Date of Patent: Jul. 6, 2004

(54) THREE DIMENSIONAL DISPLAY EMULATION METHOD AND SYSTEM

(75) Inventor: Olivier F. Prache, Pleasantville, NY (US)

(73) Assignee: eMagin Corporation, Hopewell Junction, NY (US)

( * ) Notice: Subject to any disclaimer, the term of this patent is extended or adjusted under 35 U.S.C. 154(b) by 118 days.

(21) Appl. No.: 10/017,769

(22) Filed: Oct. 30, 2001

(65) Prior Publication Data

US 2003/0080964 A1 May 1, 2003

(51) Int. Cl.[7] ................................................ G09G 5/399
(52) U.S. Cl. ......................... 345/539; 345/501; 348/42; 348/51
(58) Field of Search .................................. 345/539, 530, 345/531, 534, 501, 419, 1.1, 3.1, 6, 87, 94, 109, 55, 53, 8; 348/42, 51, 52, 55, 56

(56) References Cited

U.S. PATENT DOCUMENTS

| | | | | |
|---|---|---|---|---|
| 4,896,210 A | * | 1/1990 | Brokenshire et al. | 345/6 |
| 5,801,705 A | * | 9/1998 | Kato et al. | 345/419 |
| 5,831,638 A | * | 11/1998 | West et al. | 345/539 |
| 5,917,539 A | * | 6/1999 | Sorensen et al. | 348/42 |
| 6,078,352 A | * | 6/2000 | Nakaya et al. | 348/42 |
| 6,501,468 B1 | * | 12/2002 | Kaji | 345/419 |

OTHER PUBLICATIONS

"Double buffering technique for binocular imaging in a window" by J. S. McVeigh et al, Proceedings of SPIE—The International Society for Optical Engineering, Stereoscopic Displays and Virtual Reality Systems II, vol. 2409, Feb. 7–9, 1995, pp. 168–175.*

* cited by examiner

Primary Examiner—Kee M. Tung
(74) Attorney, Agent, or Firm—Epstein Drange, Bazerman & James, LLP

(57) ABSTRACT

A stereoscopic display device includes a pair of OLED microdisplays in a Head Mounted Display. An emulation video signal is provided to the display device. The emulation video signal includes alternating frames of left and right video data. An enable signal is provided to the left and right displays to control when image data in the display is updated so as to update data with corresponding frame data of the emulation signal. The updating of data in the combined display is at the standard rate while the updating of data in each display is at half the standard rate.

19 Claims, 3 Drawing Sheets

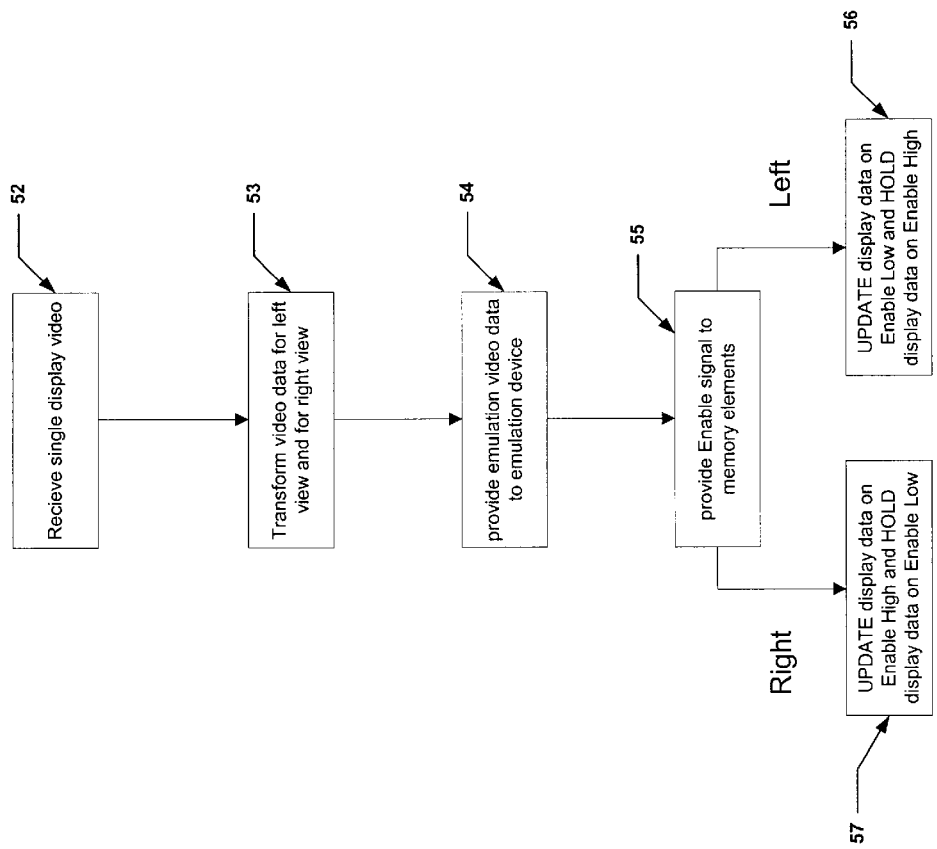

even at the low frequency of 120 HZ, causes some image degradation. Thus, there is a need for a system and method for delivering 3D stereoscopic video, which reduces power consumption and improves image quality.

THREE DIMENSIONAL DISPLAY EMULATION METHOD AND SYSTEM

FIELD OF THE INVENTION

The present invention is related to video display devices, and particularly to generating and displaying an emulation signal by a three dimensional (3-D) emulation display device.

BACKGROUND

3-D emulation devices, or stereoscopic image projectors, generally include a video screen and associated shutter glasses. The shutter glasses are adapted to be head worn by the user. Generally, the screen is rigidly coupled to the shutter glasses so as to maintain alignment of the screen and the user field of view. The screen provides a sequence of alternating images corresponding to a right eye view and a left eye view. The shutter glasses are adapted to alternate between blocking the view of the right eye and of the left eye according to synchronization with the screen so as to allow for delivering a right view image to the right eye and a left view image to the left eye. The right eye view and left eye view images can be generated by various methods including digital transformation of a two dimensional video, generation of a dual view digital video by a video processor, or by employing a stereoscopic video camera.

The shutter lenses of the shutter glasses must operate at a very high frequency so as to avoid image flicker and noticeable degradation. Such frequency is ordinarily greater than 120 Hz, which is double the standard rate of 60 Hz. Furthermore, the corresponding video data is synchronized to be delivered at the shutter frequency. Thus, the video data display consumes substantial power and imposes a limiting factor on image resolution.

The shutter glasses commonly employ LCD shutters to provide electronically controlled shutter operation. However, the slow LCD response time, even at the low frequency of 120 HZ, causes some image degradation. Thus, there is a need for a system and method for delivering 3D stereoscopic video, which reduces power consumption and improves image quality.

SUMMARY

In accordance with the present invention there is presented an emulation device adapted to receive a single channel of data, which includes data for both a left eye view and for a right eye view, and display the data on corresponding left eye and right eye displays of the device.

In one embodiment, the invention provides a method for delivering a video signal to a three dimensional emulation device having a left display associated with a left display view and a right display associated with a right display view. The method includes receiving an emulation signal, which includes frame data alternating between frame data for the left display view and frame data for the right display view. The method provides the emulation signal to the left display and to the right display. The method provides an enable signal to the left display and to the right display. The enable signal has a first state over a period corresponding to the frame period and has a second state over a subsequent period corresponding to the frame period. The enable signal is also synchronized with the emulation signal to provide the first state when the emulation signal provides the left view data and to provide the second state when the emulation signal provides the right view data. Accordingly, the left display is adapted to refresh display data in response to the first state of the clock signal and the right display is adapted to refresh display data in response to the second state of the clock signal.

In another embodiment, the invention provides a method for providing emulation video data to a 3-D emulation display device having a right display and a left display. The method includes receiving video frame data having a frame period. The method transforms frame data to generate an emulation signal, which includes consecutive frame data alternating between a left view transform and a right view transform of video frame data. The method provides the emulation signal to the right display and to the left display. Finally, the method provides an enable signal to right display and to left display. The enable signal has a first state over a time corresponding to a frame period and a second state over a time corresponding to a subsequent frame period. Therefore, the left display is adapted to update the frame data in response to the first state of the enable signal and the right display is adapted to update frame data in response to the second state of the enable signal. The enable signal is provided in synchronization with the emulation signal whereby the first state of the enable signal corresponds to the emulation signal providing left view data and the second state of the enable signal corresponding to the emulation signal providing right view data.

In yet another embodiment, the invention provides an emulation video signal display system. The system includes a video processor having a video output and a synchronization output. The video processor provides an emulation video signal to the video output. The emulation video signal includes frame data alternating between frame data for a left display view and frame data for a right display view. The emulation video signal provides each frame data over a frame period. The system also includes an enable signal generator having a control input and an enable output. The control input is coupled to the synchronization output of the video processor. The enable output provides an enable signal having a first state over a period corresponding to the frame period and having a second state over a subsequent period corresponding to the frame period. The enable signal is synchronized with the emulation signal to provide the first state when the emulation signal provides frame data for the left display view and to provide the second state when the emulation signal provides frame data for the right display view. The system further includes a first memory element having a data input, an update input, and a data output. The data input is coupled to the data output of the video processor to receive the emulation signal. The update input is coupled to the enable output of the enable signal generator. The first memory is adapted to update data in response to the first state of the enable signal. The system includes a second memory element having a data input, an update input, and a data output. The data input coupled to the data output of the video processor to receive the emulation signal. The update input coupled to the enable output of the enable signal generator. The second memory is adapted to update data in response to the second state of the enable signal. Finally, a left display has a data input coupled to the data output of the first memory element and a right display has a data input coupled to the data output of the second memory element.

BRIEF DESCRIPTION OF THE DRAWINGS

FIG. 3 is a flow diagram illustrating a method for displaying emulation video data in accordance with the invention.

DETAILED DESCRIPTION

Figure 1:
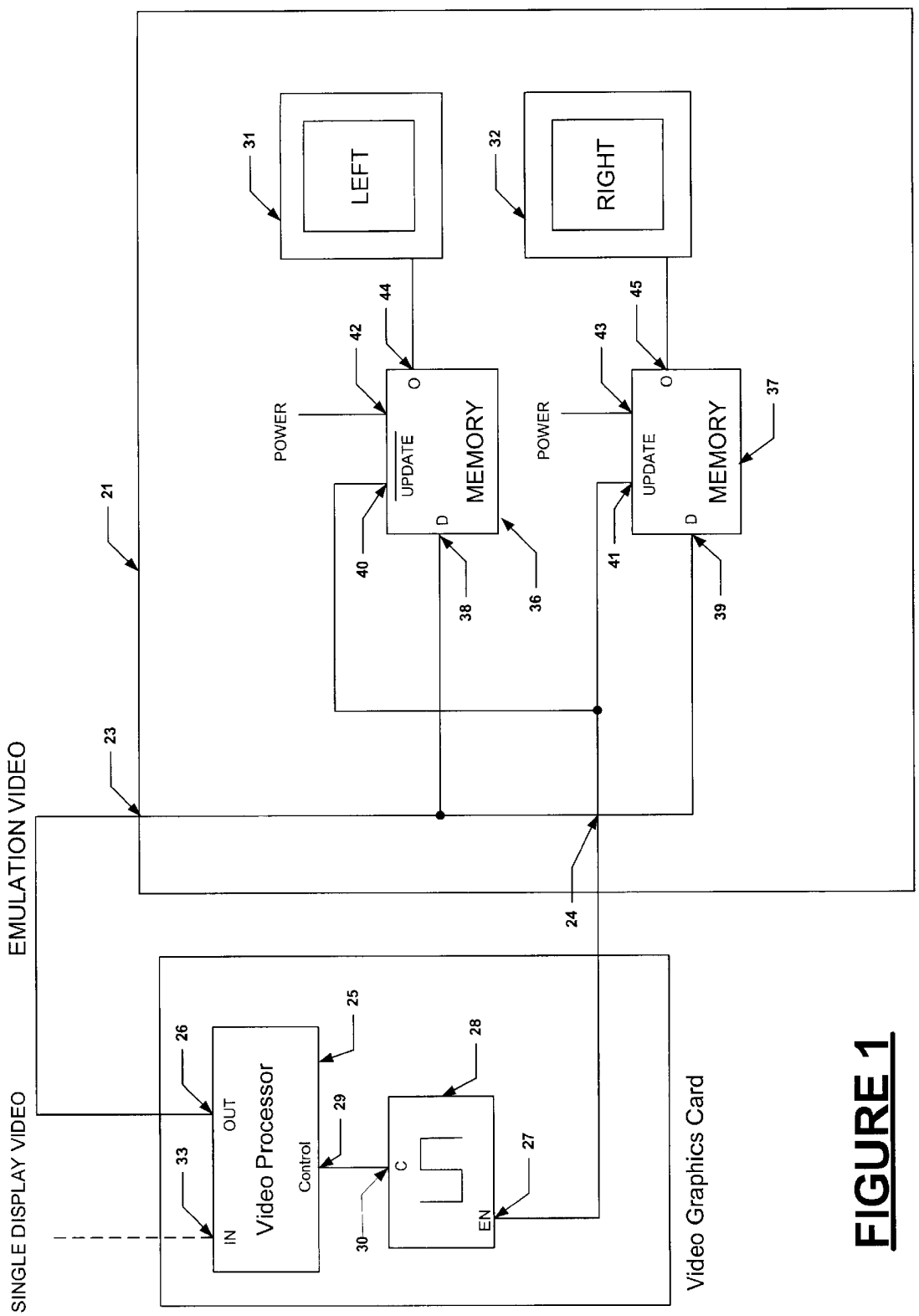
FIG. 1 illustrates a logical configuration of an emulation device in accordance with the invention.

FIG. 1 illustrates logical components of an emulation device 21 in accordance with the invention. The emulation device 21 is preferably provided as a Head Mounted Display (HMD). The emulation device 21 includes a video input 23 and a control input 24. The emulation device 21 is associated with a video processor 25, which delivers an emulation signal. The emulation device's video input 23 is coupled to the video processor's video output 26. The emulation device control input 24 is coupled to an enable signal generator's enable output 27.

Figure 2:
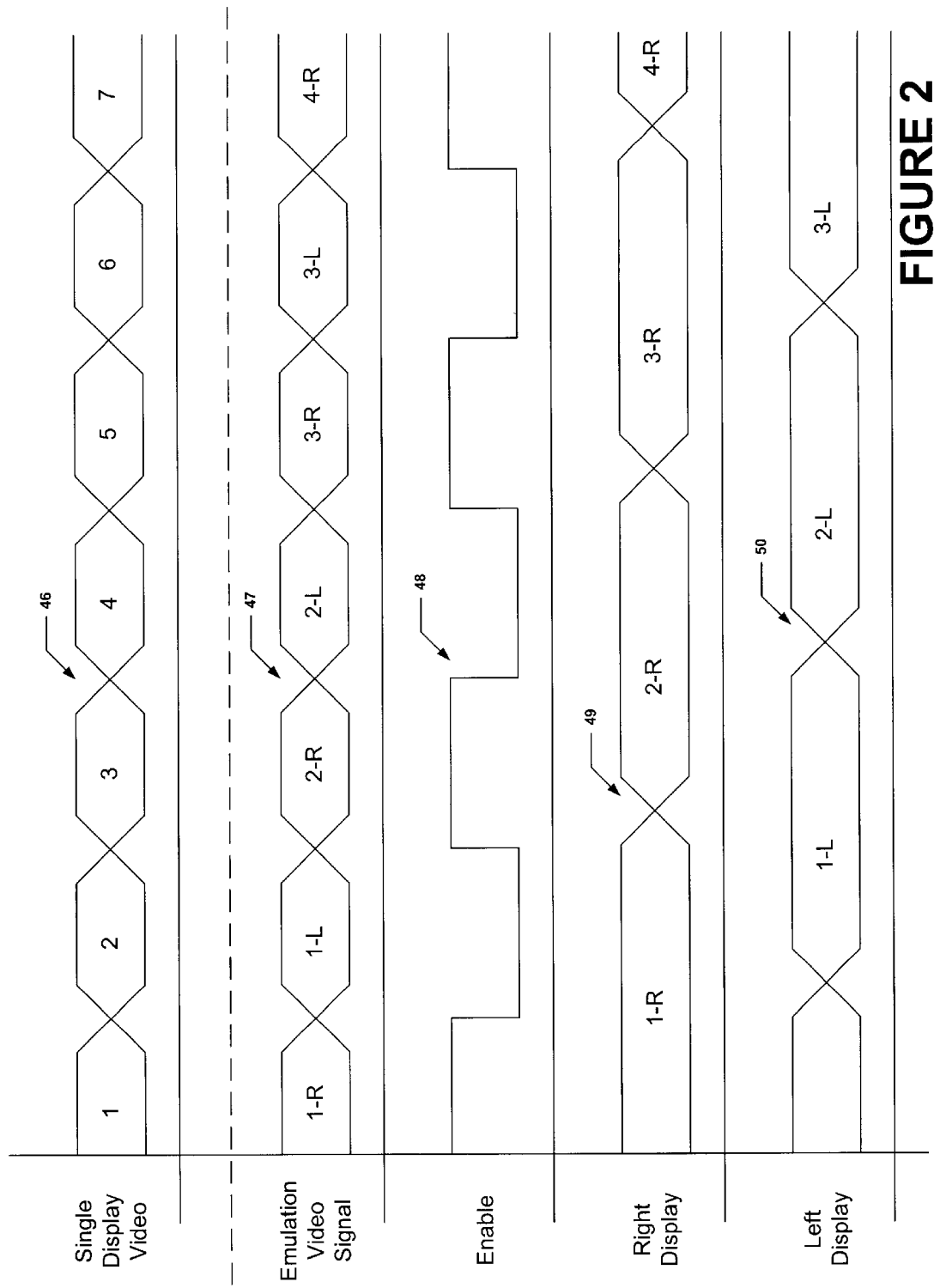
FIG. 2 illustrates a signal diagrams for signals in the configuration of FIG. 1.

The video processor 25 includes a video input 33, a video output 26, and a control output 29. The video processor 25 is preferably part of a video graphics card. The video processor 25 receives a single display video signal at the video input 33. The single display video signal is preferably a video signal adapted to be displayed by a common single display device such as a computer monitor. The video processor 25 performs a pair of transformations on each frame of the single display video signal to provide frames of the emulation signal, which is delivered to the video output 26. A first transformation corresponds to a left eye view, while a second transformation corresponds to a right eye view. In one embodiment, the video processor 25 performs the transformations on each video image frame to provide a resultant emulation signal containing alternating frames of video data for a left eye view and for a right eye view. Such an emulation signal 47 is illustrated in FIG. 2.

The video processor 25 preferably does not alter the frame ordering but rather substitutes a pair of transformed video frames for each display video frame. The resultant emulation signal is preferably a single channel video transmission, providing a plurality of video frames, having a predetermined frequency and corresponding frame period. As discussed below with reference to FIG. 2, the video signal frequency is maintained at the standard 60 Hz despite providing twice the video data in the emulation signal.

In other embodiments, the video processor 25 receives an emulation signal that already includes transformed images. In yet another embodiment, the emulation signal is locally stored by the video processor 25 on a local computer system (not shown).

An enable signal generator 28 receives control signals on a control input 30 to configure properties of the enable signal generator, such as operating frequency, which may vary depending on the frequency of the input video signal. The enable signal generator 28 provides an enable signal on its output 27. In one embodiment, the enable signal is a square wave signal having a half period providing a logical High level and a half period providing a logical Low level. The enable signal period is preferably equal to two periods of the emulation signal. In other embodiments, the enable signal is internally generated by the emulation device 21.

The emulation device 21 preferably receives other signals from the video graphics card, which are not shown for simplification purposes. Functions receiving such control and data signals include the vertical and horizontal synchronization processor (not shown) as well as the video clock recovery circuit (not shown).

The emulation device 21 further includes a pair of displays 31, 32, corresponding to a left eye display and a right eye display. Each display 31, 32, is preferably an Organic Light Emitting Diode (OLED) display, which is arranged as a matrix of OLED pixel elements. Each OLED display 31, 32, preferably includes corresponding driving circuitry adapted to provide operating current to the OLED pixel elements.

The data to the displays is provided by corresponding memory elements 36, 37. A first memory element 37 provides data to the right display 32. A second memory element 36 provided data to the right display 32. Each memory element 36, 37, includes a data input 38, 39, an update input 40, 41, a power input 42, 43, and a data output 44, 45. The data input 38, 39, receives the emulation signal provided by the video processor 25. The update input 40, 41, is used to control the memory element data updating function. Thus, in response to an active level on the update input 40, 41, the memory element updates the stored video data by reference to the video data available at the data input 38, 39. In one embodiment, the active level of the update input is a logical High level. The first memory element's update input 40 is coupled to the enable signal output of the enable signal generator 27. The second memory element's update input 41 is configured as an inverted update input so as to respond to a logical Low level of the enable signal. Each memory element's power input 42, 43 is coupled to a reference voltage source. In one embodiment, the reference voltage is 3V.

Each memory element's data output 44, 45 is coupled to the data input of the corresponding display 31, 32. The display data is preferably provided to each display 31, 32 at the standard frame rate by reference to the data stored in the corresponding memory element. Accordingly, each display provides a display output at the standard rate, regardless of whether the data in the memory has updated or is just held from the last update. In one embodiment, the memory elements 36, 37 include corresponding driver circuitry to provide operational current to the OLED displays. In another embodiment, a memory element, display, and corresponding driver circuitry, form part of a unitary element of the device. Details relating to the structure and operation of such a static memory OLED display configuration are disclosed in pending U.S. patent application Ser. No. 09/933,419, entitled "GRAYSCALE STATIC PIXEL CELL FOR OLED ACTIVE MATRIX DISPLAY," filed Aug. 20, 2001, which is hereby incorporated by reference.

FIG. 2 illustrates signals associated with the emulation device 21 of FIG. 1. A single display video signal 46, which is provided to the video processor 25, provides multiple frames of image data. In FIG. 2, seven frames, 1–7, of the single display signal are illustrated. The video processor 25 transforms the single display video frames, applying to each frame a first transformation, corresponding to a right eye view, and a second transformation, corresponding to a left eye view. As discussed above, in other embodiments, the emulation signal 47 is digitally generated to provide the alternating frame data without reference to a single display video signal 46. The illustrated emulation signal 47 includes sequential alternating frames transformed for the right eye view (1-R, 2-R, 3-R, 4-R) and for the left eye view (1-L, 2-L, 3-L).

The enable signal 48, which is provided to the update input of the memory elements, has a logical High state during a time period equal to a frame period and a logical Low state during a subsequent time period equal to the frame period. Thus, the enable signal 48 has a period of two frame periods and a frequency of half the video signal frequency.

The signal on the first memory element output 45, provided to the right display 32, includes data for the frames transformed by the right eye view transformation. The first memory element 37 responds to the logical High state of the enable signal 48 by updating the frame data with the frame data available at its data input 39. When the enable signal 48 is at a logical Low state, the first memory element 37 holds the output signal data and provides the data to the right display 32. Accordingly, the same output signal from the first memory element 37 is twice provided to the right display 32 during two frame periods of the emulation signal 47, once after a data update and once after a data hold.

The signal on the second memory element output 44, provided to the left display 31, includes data for the frames transformed by the left eye view transformation. The second memory element 36 responds to the logical Low state of the enable signal 48 by updating the frame data with the frame data available at its data input 38. When the enable signal 48 is at a logical High state, the second memory element 36 holds the output signal data and provides the data to the left display 31. Accordingly, the same output signal from the second memory element 36 is twice provided to the left display 31 during two frame periods of the emulation signal, once after a data update and once after a data hold.

The combination of the right eye display data and the left eye display data provides a simulated three dimensional image to the user. Because different transformations are used for the right display data and for the left display data, the image appears to the human brain as a 3-D image. Techniques for generating transformed images for left eye view and right eye view are well known in the art. One technique has been developed and implemented by a leading video graphics card vendor, Nvidia, and performs the two views creation automatically for applications such as games and simulations. Another technique has been established by the Joint Picture Expert Group (JPEG) for creating static stereo views, and is generally known as the jps format.

Flicker free video without degradation is provided to the user by updating image data for at least one of the displays at the standard frame rate of 60 Hz. The system of the present invention creates the appearance of a standard rate updated image while actually updating at half the rate by alternating between updating right display data and left display data. The lower frequency updating substantially reduces power consumption in the emulation device 21, making it more suitable for portable use. As may be appreciated, the method of the invention is applicable to providing video image data at other standard rates while overcoming the required rate doubling of the prior art.

FIG. 3 is a flow diagram illustrating a method for providing an emulation signal to an emulation device 21. An input video signal adapted for display in a single display device is received by the video processor 25 (step 52). The video processor 25 transforms the received video signal to an emulation signal containing frame data alternating between left eye view data and right eye view data (step 53). The transformed video data of the emulation signal is provided to the emulation device video input (step 54). An enable signal 48 is generated and provided by the emulation device 21 to control the operation of the memory elements receiving the video data (step 55). The enable signal 48 is synchronized with the input emulation signal to enable a first memory element 37 on a Logical High level of the enable signal 48 (Step 57) and enable a second memory element 36 on a logical Low level of the enable signal 48 (Step 56). Because the enable signal 48 is two frame periods long and is synchronized with the input emulation signal, one memory element receives left eye view data while the other memory element receives right eye view data to provide the user with a simulated 3-D image that is updated at the standard rate.

Although the present invention was discussed in terms of certain preferred embodiments, the invention is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A method for delivering a video signal to a three dimensional emulation device having a left display associated with a left display view and a right display associated with a right display view, comprising:

receiving an emulation signal, the emulation signal including frame data alternating between frame data for said left display view and frame data for said right display view, each frame data provided over a frame period;

providing the emulation signal to the left display and to the right display; and providing an enable signal to the left display and to the right display, the enable signal having a first state over a period corresponding to the frame period and having a second state over a subsequent period corresponding to the frame period, the enable signal synchronized with the emulation signal to provide the first state when the emulation signal provides the left view data and to provide the second state when the emulation signal provides the right view data, the left display adapted to refresh display data in response to the first state of the clock signal and the right display adapted to refresh display data in response to the second state of the clock signal.

2. The method of claim 1, further comprising:

receiving an input video signal, the video signal including a plurality of video frames each frame provided over a frame period; and generating an emulation signal, the emulation signal frames provided by applying a first frame transformation and a second frame transformation for each input video frame and sequentially ordering the resultant frames in an alternating manner between frames of the first transformation and frames of the second transformation, the first frame transformation associating transformed frames with said left display view, the second frame transformation associating transformed frames with said right display view.

3. The method of claim 1, wherein the enable signal is a square wave signal.

4. The method of claim 1, wherein the emulation device is a Hand Mounted Display.

5. The method of claim 1, wherein the emulation signal is provided at the standard frame rate for video.

6. The method of claim 1, wherein the emulation signal is provided at 60 HZ.

7. The method of claim 1, wherein the left display and the right display are OLED displays.

8. The method of claim 1, further comprising receiving the emulation signal into memory corresponding to the left display and memory corresponding to the right display to refresh display data in the respective displays.

9. The method of claim 1, wherein the emulation signal is provided by digital image transformation of a single display video signal.

10. The method of claim 1, wherein the emulation signal is directly generated to include a left view portion and a right view portion.

11. A method for providing emulation video data to a 3-D emulation display device having a right display and a left display, comprising:
  receiving video frame data having a frame period;
  transforming frame data to generate an emulation signal, the emulation signal including consecutive frame data alternating between a left view transform and a right view transform of video frame data;
  providing the emulation signal to the right display and to the left display; and
  providing an enable signal to right display and to left display, the enable signal has a first state over a time corresponding to a frame period and a second state over a time corresponding to a subsequent frame period, the left display adapted to update the frame data in response to the first state of the enable signal, the right display adapted to update frame data in response to the second state of the enable signal, the enable signal provided in synchronization with the emulation signal whereby the first state of the enable signal corresponds to the emulation signal providing left view data and the second state of the enable signal corresponding to the emulation signal providing right view data.

12. An emulation video signal display system, comprising:
  a video processor having a video output and a synchronization output, the video processor providing an emulation video signal to the video output, the emulation video signal including frame data alternating between frame data for a left display view and frame data for a right display view, the emulation video signal providing each frame data over a frame period;
  an enable signal generator having a control input and an enable output, the control input coupled to the synchronization output of the video processor, the enable output providing an enable signal having a first state over a period corresponding to the frame period and having a second state over a subsequent period corresponding to the frame period, the enable signal synchronized with the emulation signal to provide the first state when the emulation signal provides frame data for the left display view and to provide the second state when the emulation signal provides frame data for the right display view;
  a first memory element having a data input, an update input, and a data output, the data input coupled to the data output of the video processor to receive the emulation signal, the update input coupled to the enable output of the enable signal generator, the first memory adapted to update data in response to the first state of the enable signal;
  a second memory element having a data input, an update input, and a data output, the data input coupled to the data output of the video processor to receive the emulation signal, the update input coupled to the enable output of the enable signal generator, the second memory adapted to update data in response to the second state of the enable signal;
  a left display having a data input coupled to the data output of the first memory element; and
  a right display having a data input coupled to the data output of the second memory element.

13. The system of claim 12, wherein the enable signal is a square wave signal.

14. The system of claim 12, wherein the emulation video signal display system is a Hand Mounted Display.

15. The system of claim 12, wherein the emulation video signal is provided at the standard frame rate for video.

16. The system of claim 12, wherein the emulation video signal is provided at 60 HZ.

17. The system of claim 12, wherein the left display and the right display are OLED displays.

18. The system of claim 12, wherein the video processor provides the emulation video signal to the video output by transforming an input single display video signal.

19. The system of claim 12, wherein the video processor provides the emulation video signal to the video output by directly generating an emulation video signal having a left view portion and a right view portion.

* * * * *